(12) United States Patent
Wasily

(10) Patent No.: US 9,942,797 B2
(45) Date of Patent: *Apr. 10, 2018

(54) PERMITTING COEXISTENCE OF DATA TRANSFER OF INTERFERING WIRELESS SIGNALS

(71) Applicant: Atmel Corporation, San Jose, CA (US)

(72) Inventor: Nabil Yousef Wasily, Foothill Ranch, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,604

(22) Filed: Nov. 30, 2016

(65) Prior Publication Data
US 2017/0086097 A1  Mar. 23, 2017

Related U.S. Application Data

(63) Continuation of application No. 13/904,020, filed on May 29, 2013, now Pat. No. 9,544,813.
(Continued)

(51) Int. Cl.
H04W 28/04  (2009.01)
H04W 88/06  (2009.01)
H04M 1/725  (2006.01)
H04B 1/403  (2015.01)
H04W 72/12  (2009.01)
(Continued)

(52) U.S. Cl.
CPC .......... *H04W 28/048* (2013.01); *H04B 1/406* (2013.01); *H04M 1/7253* (2013.01); *H04W 4/008* (2013.01); *H04W 52/0232* (2013.01); *H04W 72/1215* (2013.01); *H04W 74/0816* (2013.01); *H04W 88/06* (2013.01); *Y02B 60/50* (2013.01)

(58) Field of Classification Search
CPC ............... H04W 28/048; H04W 74/08; H04W 72/1215; H04W 16/14; H04W 88/06; H04M 1/7253
See application file for complete search history.

(56) References Cited

U.S. PATENT DOCUMENTS 9,544,813 B2  1/2017  Wasily
2007/0197256 A1 * 8/2007  Lu .......................... H04B 1/406
455/552.1

(Continued)

Primary Examiner — Warner Wong
Assistant Examiner — Mewale Ambaye
(74) Attorney, Agent, or Firm — Fish & Richardson P.C.

(57) ABSTRACT

A system and method of permitting coexistence of WiFi and Bluetooth® data transfer on a single chip in UE including a transceiver includes using CTS data packets to protect Bluetooth® signals for SCO communication links; using only WiFi circuitry in the chip to determine when Bluetooth® data transfer is required by the UE; establishing a specified period of the Bluetooth® data transfer; and starting WiFi medium contention only upon an end of the specified period of the Bluetooth® data transfer on the single chip. The power save mode of the WiFi circuitry may be used with Bluetooth® ACL data packets in WiFi periodic data transfer gaps. The WiFi data transfer has no timing constraints, whereas the Bluetooth® data transfer has timing constraints and can only occur during the specified period. The WiFi data transfer does not occur when the Bluetooth® data transfer is occurring.

18 Claims, 6 Drawing Sheets

Related U.S. Application Data

(60) Provisional application No. 61/652,654, filed on May 29, 2012.

(51) Int. Cl.
*H04W 4/00* (2018.01)
*H04W 52/02* (2009.01)
*H04W 74/08* (2009.01)

(56) References Cited

U.S. PATENT DOCUMENTS

| | | |
|---|---|---|
| 2009/0176454 A1 | 7/2009 | Chen |
| 2010/0112950 A1 | 5/2010 | Haartsen et al. |
| 2010/0165959 A1 | 7/2010 | Park |
| 2010/0284380 A1* | 11/2010 | Banerjee ............... H04W 16/14 370/338 |
| 2011/0059768 A1* | 3/2011 | Pandruvada .......... H04W 88/06 455/552.1 |
| 2011/0111708 A1 | 5/2011 | Tu |
| 2012/0120857 A1* | 5/2012 | Sudak ............... H04W 52/0216 370/311 |
| 2012/0164948 A1* | 6/2012 | Narasimha ................ H04L 1/16 455/63.1 |
| 2013/0322315 A1 | 12/2013 | Wasily |

* cited by examiner

PERMITTING COEXISTENCE OF DATA TRANSFER OF INTERFERING WIRELESS SIGNALS

CROSS-REFERENCE TO RELATED APPLICATIONS

This application is a continuation of U.S. patent application Ser. No. 13/904,020 filed on May 29, 2013, now issued as U.S. Pat. No. 9,544,813, which claims priority to U.S. Provisional Application Ser. No. 61/652,654 filed on May 29, 2012, the complete disclosure of which, in its entirety, is herein incorporated by reference.

BACKGROUND

Technical Field

The embodiments herein generally relate to wireless technologies, and more particularly to WiFi and Bluetooth® technologies.

Description of the Related Art

WiFi and Bluetooth® wireless standards use the same carrier band (e.g., 2.4 GHz) to transfer and receive data packets. However, if a WiFi transceiver and a Bluetooth® transceiver are proximately coexisting, then they can interfere with one another. For example, if a WiFi transceiver in user equipment (UE) is transferring data packets to a router, and a Bluetooth® transceiver in the UE is transferring audio to a headset, if the two transceivers have no idea of the existence of the other corresponding transceiver, then they will interfere and destroy each other's data packets. Combination chips have both WiFi and Bluetooth® transceivers on the same chip die, however without avoiding data interference, there would be low throughput and dropped calls, etc. Moreover, previous solutions of permitting both WiFi and Bluetooth® transceivers to work together have resulted in increased chip sizes and costs. Accordingly, there is a need for a solution that avoids data interference and destruction of data packets due to the coexistence of both WiFi and Bluetooth® transceivers.

SUMMARY

In view of the foregoing, an embodiment herein provides a method of permitting coexistence of WiFi and Bluetooth® data transfer on a single chip in a user equipment (UE) comprising a transceiver, the method comprising using clear to send (CTS) data packets to protect Bluetooth® signals for synchronous connection-oriented (SCO) communication links; using only WiFi circuitry in the chip to determine when Bluetooth® data transfer is required by the UE; establishing a specified period of the Bluetooth® data transfer; and starting WiFi medium contention only upon an end of the specified period of the Bluetooth® data transfer on the single chip. The method may further comprise using a power save mode of the WiFi circuitry with Bluetooth® asynchronous connection-less (ACL) data packets in WiFi periodic data transfer gaps. The WiFi data transfer has no timing constraints, whereas the Bluetooth® data transfer has timing constraints and can only occur during the specified period. The WiFi data transfer does not occur when the Bluetooth® data transfer is occurring. The method may further comprise using the WiFi circuitry to determine when the specified period for the Bluetooth® data transfer ends. The method may further comprise the WiFi circuitry indicating to a router that the transceiver is entering into a sleep mode of operation; and the WiFi circuitry beginning the Bluetooth® ACL data packet transmission upon the sleep mode of operation beginning. Upon completion of the Bluetooth® data transfer, the WiFi circuitry ending the sleep mode of operation by waking up and beginning the WiFi data transfer. The method may further comprise using a Bluetooth® SNIFF mode for Bluetooth® slave modes during the Bluetooth® data transfer. A slave device tells a master device that the slave device is in SNIFF mode and will wake up once the WiFi circuitry tells the slave device that it can wake up from a sleep mode of operation. The WiFi and Bluetooth® signals are shared and coexist in a time domain.

Another embodiment provides a system of permitting coexistence of WiFi and Bluetooth® data transfer on a single chip in a UE comprising a transceiver, the system comprising WiFi circuitry in the chip, wherein the WiFi circuitry uses CTS data packets that protect Bluetooth® signals for SCO communication links, wherein only the WiFi circuitry is used to determine when Bluetooth® data transfer is required by the UE, and wherein the Bluetooth® data transfer occurs for a specified period; and a processor that calculates the specified period, wherein WiFi medium contention begins only upon an end of the specified period of the Bluetooth® data transfer on the single chip. The WiFi circuitry comprises a power save mode with Bluetooth® ACL data packets in WiFi periodic data transfer gaps. The WiFi data transfer has no timing constraints, whereas the Bluetooth® data transfer has timing constraints and can only occur during the specified period. The WiFi data transfer does not occur when the Bluetooth® data transfer is occurring. The WiFi circuitry determines when the specified period for the Bluetooth® data transfer ends. The WiFi circuitry indicates to a router that the transceiver is entering into a sleep mode of operation, wherein the WiFi circuitry begins the Bluetooth® ACL data packet transmission upon the sleep mode of operation beginning. Upon completion of the Bluetooth® data transfer, the WiFi circuitry ending the sleep mode of operation by waking up and beginning the WiFi data transfer. The WiFi circuitry uses a Bluetooth® SNIFF mode for Bluetooth® slave modes during the Bluetooth® data transfer. A slave device tells a master device that the slave device is in SNIFF mode and will wake up once the WiFi circuitry tells the slave device that it can wake up from a sleep mode of operation. The WiFi and Bluetooth® signals are shared and coexist in a time domain.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
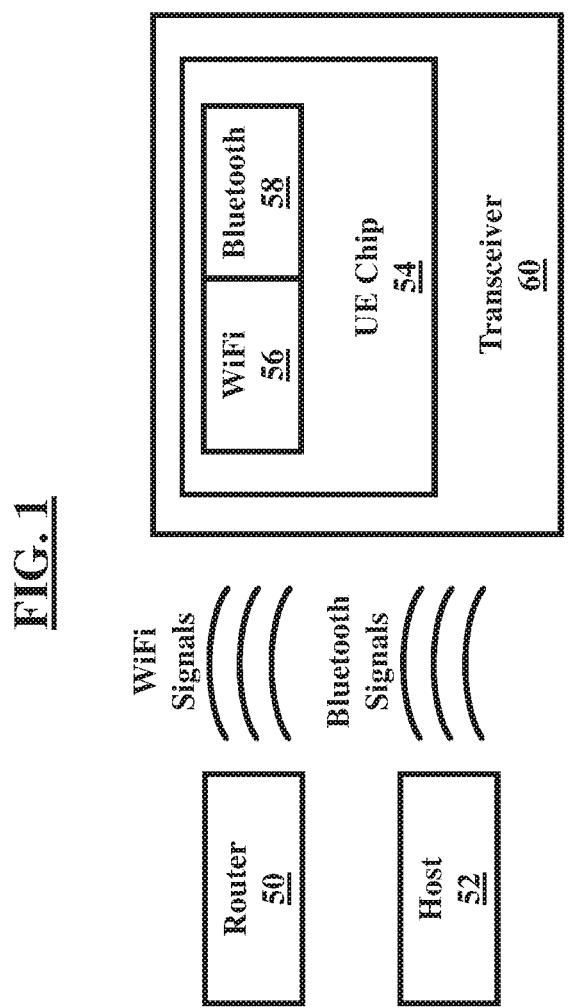
FIG. 1 illustrates a schematic diagram of a communication system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a single silicon chip architecture that permits the coexistence of WiFi and Bluetooth® transceivers in a cost-effective and chip area saving manner. Referring now to the drawings, and more particularly to FIGS. 1 through 6, where similar reference characters denote corresponding features consistently throughout the figures, there are shown preferred embodiments.

The embodiments herein use the clear to send (CTS) packet to self-protect Bluetooth® signals for synchronous connection-oriented (SCO) links. WiFi should contend on media right after Bluetooth® data transfer is performed. The embodiments herein use power saving WiFi with Bluetooth® asynchronous connection-less (ACL) data packets in WiFi periodic data transfer gaps. The embodiments herein use the Bluetooth® SNIFF mode for Bluetooth® slave modes.

Figure 2:
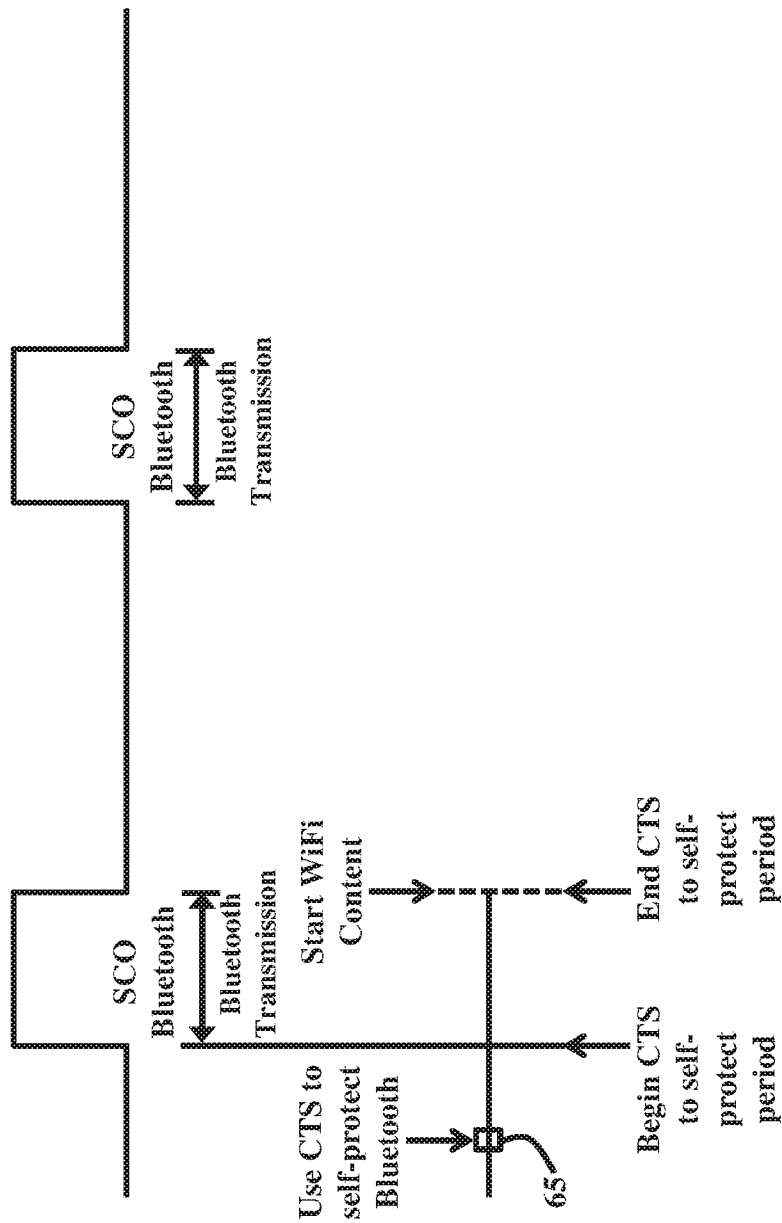
FIG. 2 illustrates a waveform diagram of WiFi and Bluetooth® signal coexistence according to an embodiment herein.

FIGS. 1 and 2 illustrate aspects of the embodiments herein. The WiFi and Bluetooth® signals are shared/coexist in the time domain. When the WiFi data transfer is on, the Bluetooth® data transfer is off. The Bluetooth® signals use the existing WiFi circuitry 56 on the UE chip 54 according to the embodiments herein, wherein the WiFi circuitry 56 is the "brain", but the Bluetooth® signals get whatever it asks for in terms of data transfer. In FIG. 2, with reference to FIG. 1, a signal transfer wave function is depicted where the Bluetooth® signal is in audio data transmission from a host 52. The Bluetooth® device 58 uses CTS packets 65 for self-protection of its data packets from interference from WiFi data transmission for a specific period of time t, whereby the CTS packets 65 protect the upcoming Bluetooth® data transmission. Accordingly, the WiFi circuitry 56 is configured not to receive data packets during the Bluetooth® data transmission.

The Bluetooth® data transfer also uses the SCO link during its transmission whereby the SCO link is a set of timeslots that are reserved on an existing ACL link. The Bluetooth® signals (e.g., audio data) are transferred during the reserved timeslot. The SCO data packets are sent every 1, 2, or 3 timeslots. The end of the CTS period marks the beginning of the WiFi contention. The WiFi data transfer process knows when the start of WiFi contention will occur and accordingly has no timing constraints, whereby the Bluetooth® data transfer process has timing constraints and can only occur at specific times. Accordingly, the WiFi data transfer does not occur when Bluetooth® data transfer is occurring. Immediately after the Bluetooth® data transfer occurs and is completed, the WiFi contention on the media occurs, and the WiFi circuitry 56 knows when this will occur.

Figure 3:
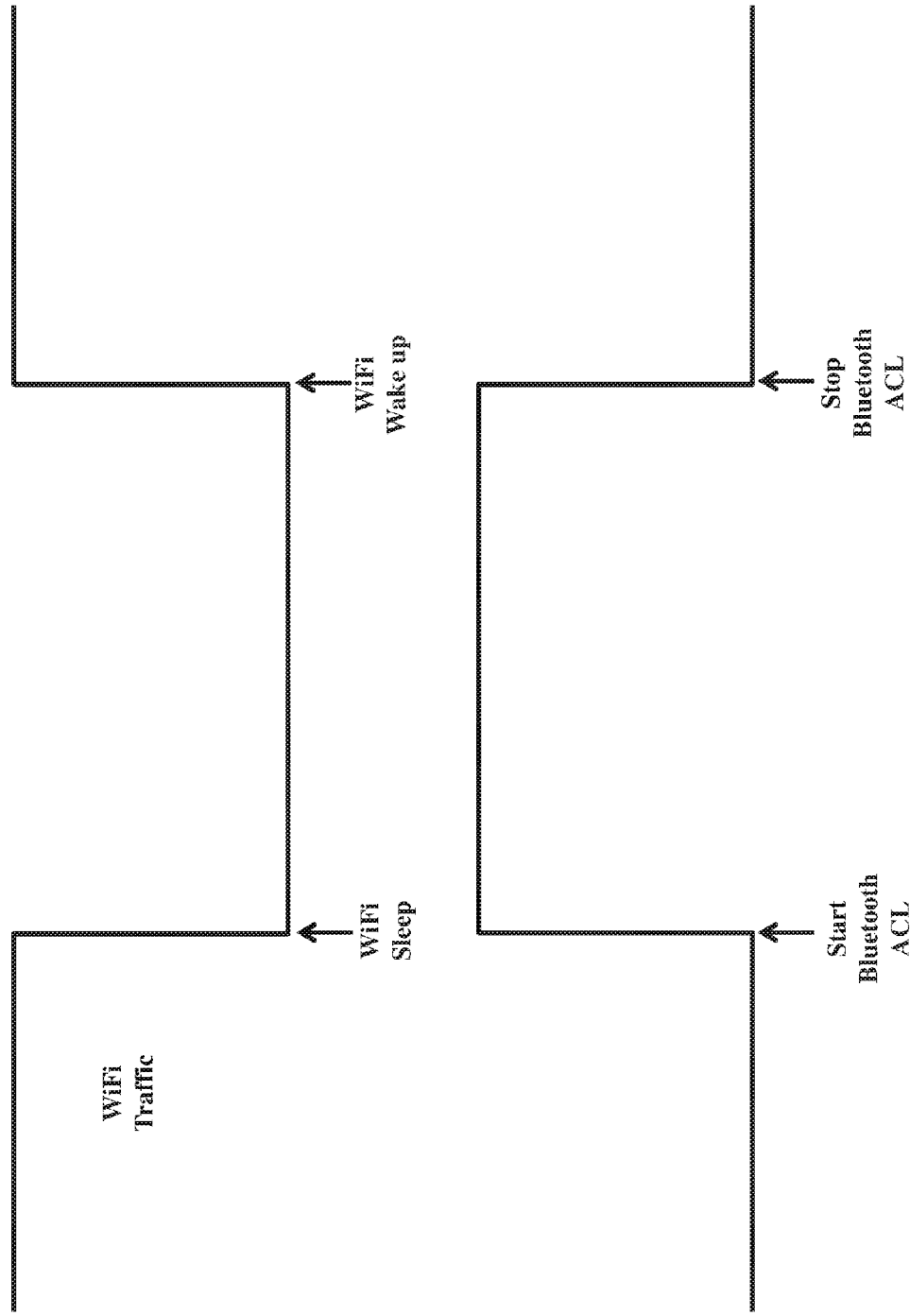
FIG. 3 illustrates another waveform diagram of WiFi and Bluetooth® signal coexistence according to an embodiment herein.

In another embodiment, as shown in FIG. 3, with reference to FIGS. 1 and 2, the WiFi circuitry 56 tells the router 50 that the transceiver 60 is going to sleep, and then starts Bluetooth® ACL transmission. When the Bluetooth® data transfer stops, then the WiFi circuit 56 wakes up and begins the WiFi data transfer. Accordingly, use of the power save mode on the WiFi circuit 56 allows a gap to be created in the WiFi transmission from the router 50 to the transceiver 60. Another embodiment herein uses the Bluetooth® SNIFF mode for Bluetooth® slave modes. Here, the slave (e.g., Bluetooth® mode 58) tells the master (e.g., host 52) that the slave (e.g., Bluetooth® mode 58) is in SNIFF mode and will wake up once the WiFi circuit 56 tells it that it can.

Figure 4:
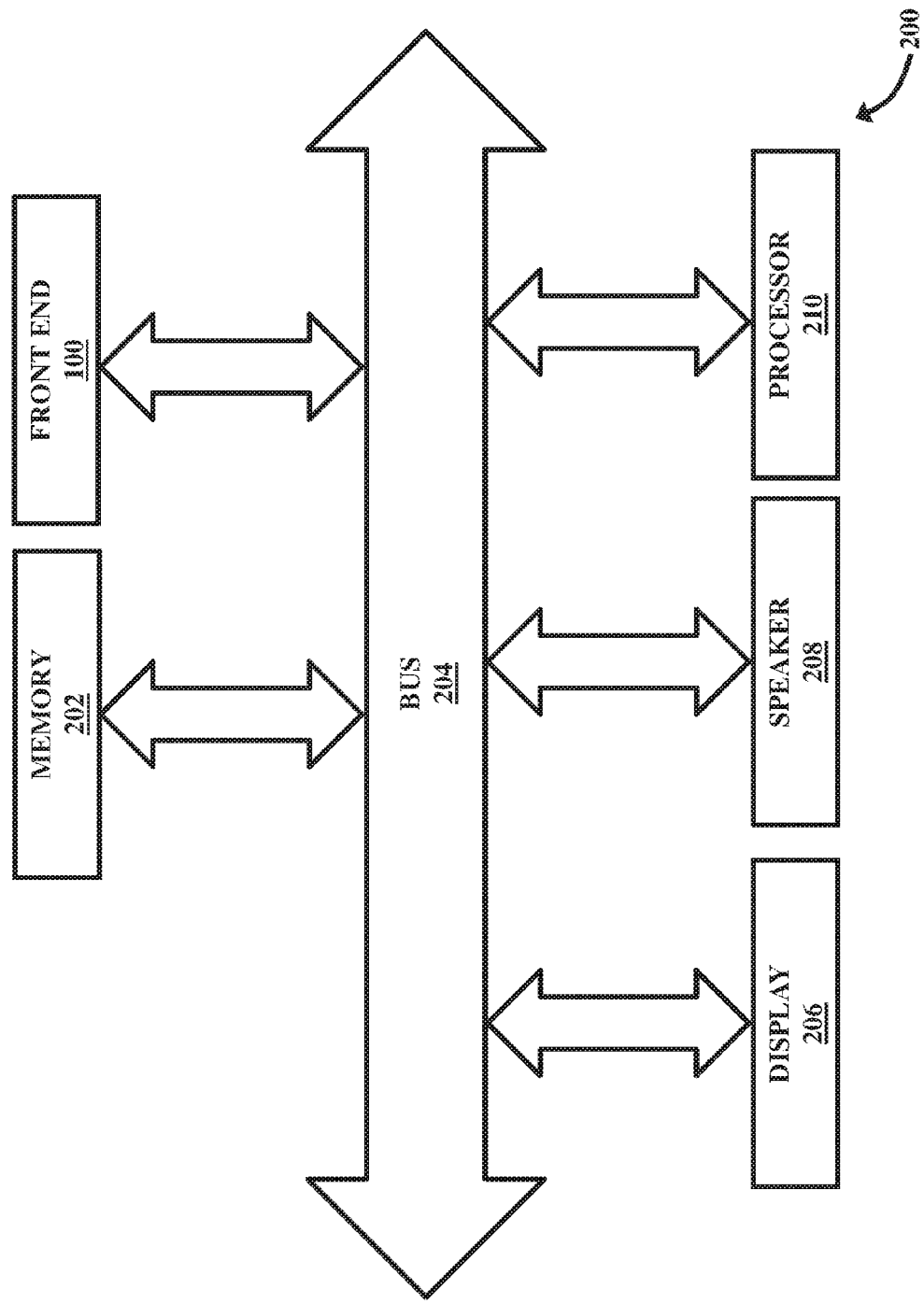
FIG. 4 illustrates a block diagram of a receiver according to an embodiment herein.

FIG. 4, with reference to FIGS. 1 through 3, illustrates an exploded view of a UE 200 having a memory 202 comprising a computer set of instructions. The UE 200 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 may also carry out the methods described herein and in accordance with the embodiments herein. The content may also be stored in the memory 202 for future processing or consumption. A user of the UE 200 may view this stored information on display 206. When the content is selected, the processor 210 may pass information. The content may be passed among functions within the UE 200 using bus 204. The UE 200 may be operatively connected to a front end 100 for communication within a wireless communication network 25 (of FIG. 5).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
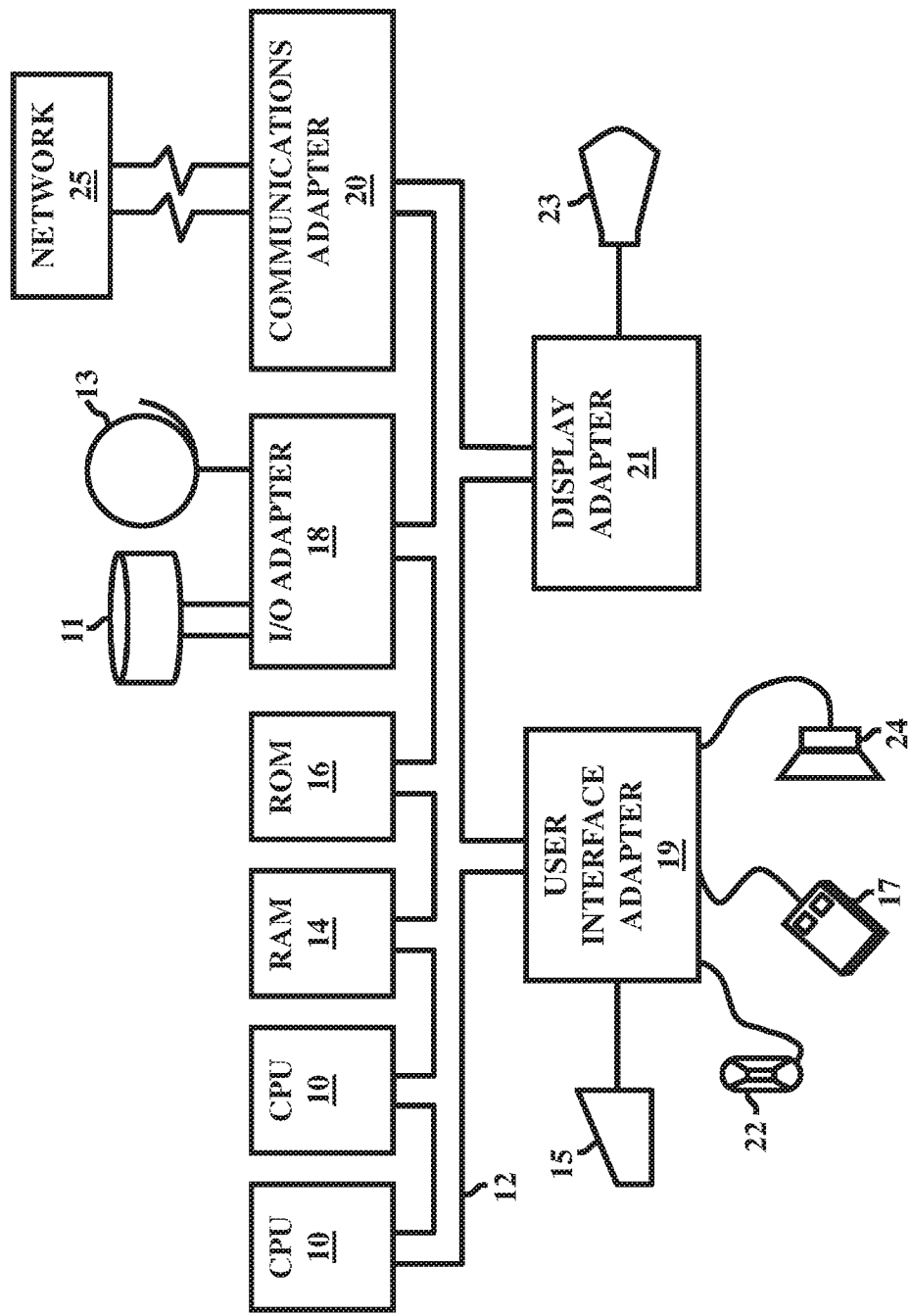
FIG. 5 illustrates a block diagram of a computer system according to an embodiment herein.

A representative hardware environment for practicing the embodiments herein is depicted in FIG. 5, with reference to FIGS. 1 through 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
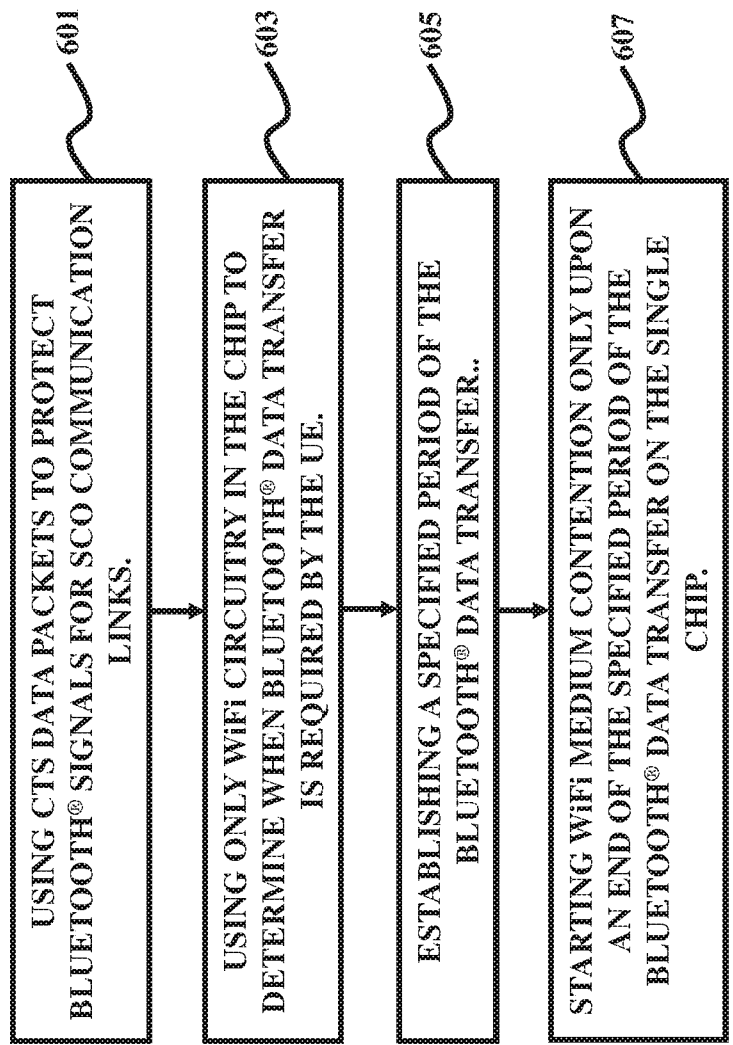
FIG. 6 is a flow diagram illustrating a method according to an embodiment herein.

FIG. 6, with reference to FIGS. 1 through 5, is a flow diagram illustrating a method of permitting coexistence of WiFi and Bluetooth® data transfer on a single chip 54 in a UE 200 comprising a transceiver 60 according to an embodiment herein, the method comprising using (601) CTS data packets 65 to protect Bluetooth® signals for SCO communication links; using (603) only WiFi circuitry 56 in the chip 54 to determine when Bluetooth® data transfer is required by the UE 200; establishing (605) a specified period of the Bluetooth® data transfer (e.g. using processor 210, for example); and starting (607) WiFi medium contention only upon an end of the specified period of the Bluetooth® data transfer on the single chip 54. The method may further comprise using a power save mode of the WiFi circuitry 56 with Bluetooth® ACL data packets in WiFi periodic data transfer gaps. The WiFi data transfer has no timing constraints, and the Bluetooth® data transfer has timing constraints and can only occur during the specified period. The WiFi data transfer does not occur when the Bluetooth® data transfer is occurring. The method may further comprise using the WiFi circuitry 56 to determine when the specified period for the Bluetooth® data transfer ends. The method may further comprise the WiFi circuitry 56 indicating to a router 50 that the transceiver 60 is entering into a sleep mode of operation; and the WiFi circuitry 56 beginning the Bluetooth® ACL data packet transmission upon the sleep mode of operation beginning. Upon completion of the Bluetooth® data transfer, the WiFi circuitry 56 ends the sleep mode of operation by waking up and beginning the WiFi data transfer. The method may further comprise using a Bluetooth® SNIFF mode for Bluetooth® slave modes during the Bluetooth® data transfer. A slave device (e.g., Bluetooth® mode 58) tells a master device (e.g., host 52) that the slave device (e.g., Bluetooth® mode 58) is in SNIFF mode and will wake up once the WiFi circuitry 56 tells the slave device that it can wake up from a sleep mode of operation. The WiFi and Bluetooth® signals are shared and coexist in a time domain.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A method comprising:
establishing a period for a data transfer of a first data transmission protocol in periodic data transfer gaps of a second data transmission protocol, the periodic data transfer gaps being created by a circuitry for the second data transmission protocol;

beginning, by the circuitry for the second data transmission protocol, the data transfer of the first data transmission protocol in the period;
using a sniff mode by a circuitry for the first data transmission protocol during the data transfer for the first data transmission protocol;
determining when the data transfer of the first data transmission protocol is to be implemented using the circuitry of the second data transmission protocol;
starting a data transfer of the second data transmission protocol upon an end of the period,
wherein the data transfer of the second data transmission protocol has no timing constraints and occurs outside the periodic data transfer gaps, and the data transfer of the first data transmission protocol has timing constraints and occurs during the period.

2. The method of claim 1, wherein the data transfer of the second data transmission protocol does not occur when the data transfer of the first data transmission protocol occurs.

3. The method of claim 1, further comprising:
determining that the circuitry of the second data transmission protocol has entered into a power save mode; and
indicating, from the circuitry for the second data transmission protocol, to a router that a transceiver is entering into the power save mode, the circuitry of the second data transmission being on a chip comprising the transceiver.

4. The method of claim 3, further comprising:
beginning, by the circuitry for the second data transmission protocol, asynchronous connection-less (ACL) data packet transmissions of the first data transmission protocol in the periodic data transfer gaps of the second data transmission protocol during the power save mode.

5. The method of claim 3, further comprising:
upon completion of the data transfer for the first data transmission protocol, ending, by the circuitry of the second data transmission protocol, the power save mode by waking up and beginning the data transfer for the second data transmission protocol.

6. The method of claim 1, further comprising:
indicating, by the circuitry for the first data transmission protocol, to a host device that the circuitry for the first data transmission protocol is in the sniff mode, and
waking up, by the circuitry for the first data transmission protocol, when the circuitry for the second data transmission protocol causes the circuitry for the first data transmission protocol to wake up from a sleep mode of operation.

7. The method of claim 1, further comprising:
protecting signals of the first data transmission protocol using clear to end (CTS) data packets for synchronous connection-oriented (SCO) communication links.

8. The method of claim 7, wherein establishing the period for the data transfer of the first data transmission protocol comprises:
establishing the period for the data transfer of the first data transmission protocol based on durations of the CTS data packets.

9. The method of claim 7, wherein the signals of the first data transmission protocol are generated from the circuitry for the first data transmission protocol, and
wherein the circuitry of the second data transmission protocol and the circuitry of the first data transmission protocol are on a single chip.

10. The method of claim 1, wherein the first data transmission protocol comprises a Bluetooth protocol and the second data transmission protocol comprises a WiFi protocol, and
wherein signals for the first data transmission protocol and the second data transmission protocol are shared and coexist in a time domain.

11. A system comprising:
a circuitry for a second data transmission protocol configured to:
establish a period for a data transfer of a first data transmission protocol in periodic data transfer gaps of the second data transmission protocol, the periodic data transfer gaps being created by a circuitry for the second data transmission protocol;
begin the data transfer of the first data transmission protocol in the period;
determine when the data transfer of the first data transmission protocol is to be implemented; and
start a data transfer of the second data transmission protocol upon an end of the period,
wherein the data transfer of the second data transmission protocol has no timing constraints and occurs outside the periodic data transfer gaps, and the data transfer of the first data transmission protocol has timing constraints and occurs during the period; and
a circuitry for the first data transmission protocol configured to use a sniff mode during the data transfer for the first data transmission protocol.

12. The system of claim 11, further comprising:
a data processing system including a processor and configured to cause the processor to:
determine that the circuitry of the second data transmission protocol has entered into a power save mode; and
indicate, from the circuitry for the second data transmission protocol, to a router that a transceiver is entering into the power save mode, the circuitry of the second data transmission being on a chip comprising the transceiver.

13. The system of claim 12, wherein the circuitry for the second data transmission protocol is configured to:
begin asynchronous connection-less (ACL) data packet transmissions of the first data transmission protocol in the periodic data transfer gaps of the second data transmission protocol during the power save mode.

14. The system of claim 12, wherein the circuitry for the second data transmission protocol is configured to:
upon completion of the data transfer for the first data transmission protocol, end the power save mode by waking up and beginning the data transfer for the second data transmission protocol.

15. The system of claim 11, wherein the circuitry for the first data transmission protocol is configured to:
indicate to a host device that the circuitry for the first data transmission protocol is in the sniff mode; and
wake up when the circuitry for the second data transmission protocol causes the circuitry for the first data transmission protocol to wake up from a sleep mode of operation.

16. The system of claim 11, wherein the circuitry of the second data transmission protocol is configured to:
protect signals of the first data transmission protocol using clear to end (CTS) data packets for synchronous connection-oriented (SCO) communication links; and establish the period for the data transfer of the first data transmission protocol based on durations of the CTS data packets.

17. The system of claim 11,
wherein the circuitry for the first data transmission protocol is configured to generate signals of the data transfer of the first data transmission protocol,
wherein the circuitry of the second data transmission protocol and the circuitry of the first data transmission protocol are integrated on a single chip comprising a transceiver.

18. The system of claim 11, wherein the first data transmission protocol comprises a Bluetooth protocol and the second data transmission protocol comprises a WiFi protocol, and
wherein signals for the first data transmission protocol and the second data transmission protocol are shared and coexist in a time domain.

\* \* \* \* \*

UNITED STATES PATENT AND TRADEMARK OFFICE
CERTIFICATE OF CORRECTION

PATENT NO. : 9,942,797 B2
APPLICATION NO. : 15/365604
DATED : April 10, 2018
INVENTOR(S) : Nabil Yousef Wasily Page 1 of 1

It is certified that error appears in the above-identified patent and that said Letters Patent is hereby corrected as shown below:

In the Drawings

Sheet 6 of 6, Figure 6, 3rd box, replace "TRANSFER.." with --TRANSFER.--; and

In the Specification

Column 5, Line 3, after "either" insert --(a)--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*